United States Patent [19]

Koine

[11] Patent Number: 4,796,512
[45] Date of Patent: Jan. 10, 1989

[54] EXTERNALLY DRIVEN AUTOMATIC WEAPON

[75] Inventor: Richard Koine, Ratingen, Fed. Rep. of Germany

[73] Assignee: Rheinmetall GmbH, Düsseldorf, Fed. Rep. of Germany

[21] Appl. No.: 106,952

[22] Filed: Oct. 13, 1987

[30] Foreign Application Priority Data

Oct. 13, 1986 [DE] Fed. Rep. of Germany ....... 3634815

[51] Int. Cl.$^4$ ............................................... F41D 7/00
[52] U.S. Cl. ............................................... 89/11; 89/9
[58] Field of Search ................................. 89/11, 9, 135

[56] References Cited

U.S. PATENT DOCUMENTS

| | | | |
|---|---|---|---|
| 3,005,357 | 10/1961 | Christian | 74/421 A |
| 3,224,289 | 12/1965 | Palm | 74/421 A |
| 3,648,561 | 3/1972 | Stoner . | |
| 4,683,799 | 8/1987 | Post et al. | 89/11 |

FOREIGN PATENT DOCUMENTS 3325801 1/1985 Fed. Rep. of Germany .

Primary Examiner—David H. Brown
Attorney, Agent, or Firm—Spencer & Frank

[57] ABSTRACT

An externally driven automatic weapon in which the breechblock and the function of supplying cartridges into the cartridge chamber are effected or controlled by means of a rotatably mounted control cylinder which is provided with a camming path on its circumference and which is driven by an external drive arrangement including a motor and gears for connecting the output of the motor to the control cylinder. The motor and the gears for the control cylinder are disposed within the control cylinder, with the motor being connected to a first nonrotatable stub shaft on which one end of the control cylinder is rotatably supported and with a gear housing or gear block for the gears being connected either to the control cylinder or to a further nonrotatable stub shaft on which the other end of the control cylinder is rotatably mounted. Alternatively, the control cylinder itself may be configured as part of an electric motor which serves as the primary drive, e.g., in the form of a barrel-type engine.

6 Claims, 3 Drawing Sheets

FIG.2

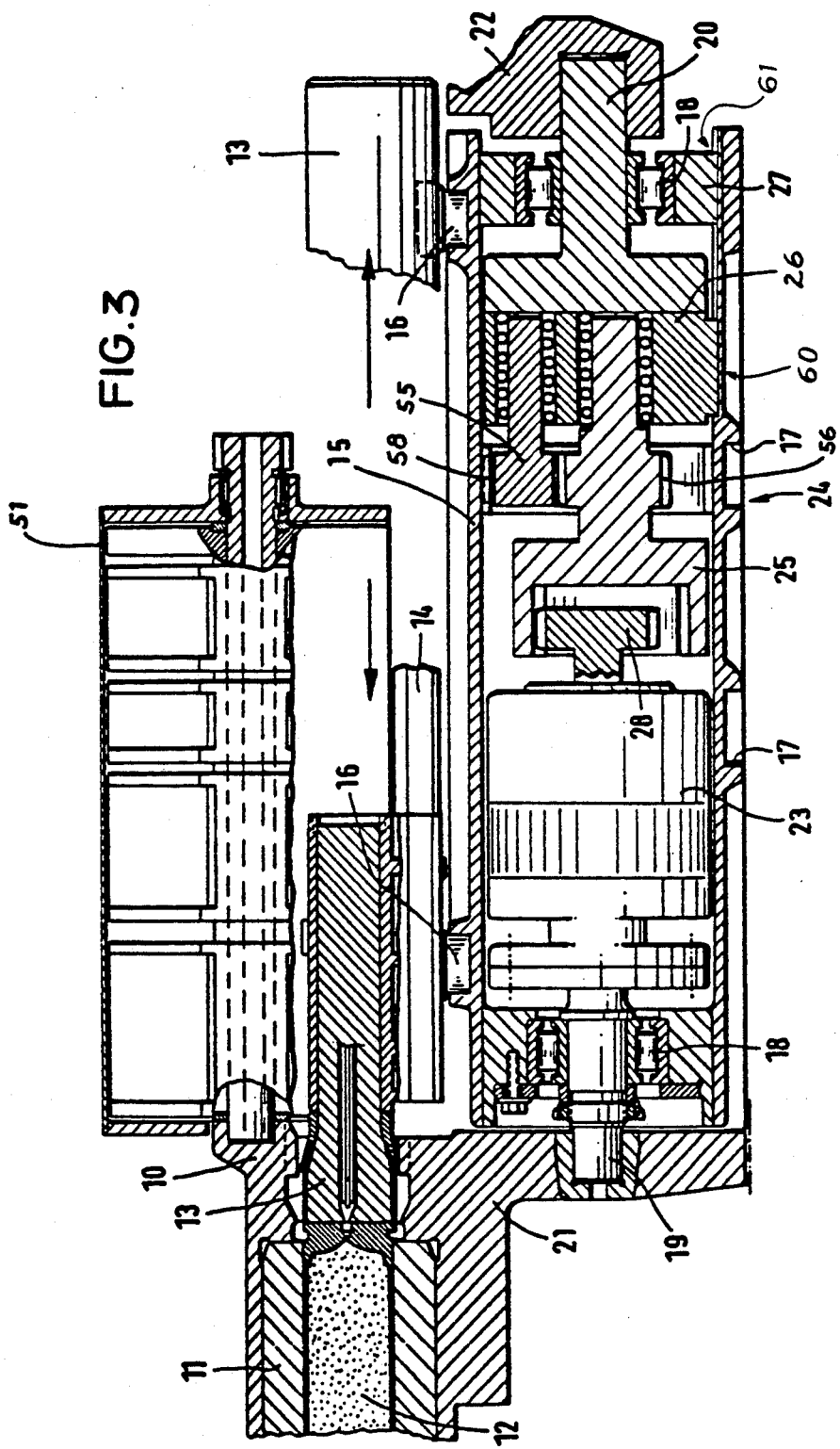

EXTERNALLY DRIVEN AUTOMATIC WEAPON

BACKGROUND OF THE INVENTION

1. Field of the Invention

The present invention relates to an externally driven automatic weapon having at least one control cylinder driven by a motor and provided with a camming path on its outer circumference, so that rotation of the control cylinder causes reciprocating linear movement of the breechblock and cartridge supply slide.

2. Discussion of the Prior Art

In prior art automatic weapons of a caliber of, for example 35 mm, external drives are preferentially employed to ensure continuity of energy flow in the operation of the machine. This is in contrast to self-loaders or gas pressure loaders where the contributed energy is available only for a very short period of time while the energy requirement continues over a longer period of time. The problem is thus the storage of the energy surge over the time required for the succession of machine functions.

Prior art externally driven automatic weapons have the drawback that their motor and the associated drive mechanism require a considerable amount of room as peripherally series connected arrangements and this sometimes considerably enlarges the external dimensions of the automatic weapon, thereby making mounting of such a weapon more difficult.

Although it is known from U.S. Pat. No. 3,648,561, issued Mar. 14, 1972, to place the motor and drive gears for the control cylinder within the control cylinder, the arrangement disclosed in this patent requires specialy formed and relatively complex mechanical parts for the mounting of both the cylinder and the motor and gears therein.

SUMMARY OF THE INVENTION

It is therefore an object of the present invention to provide an externally driven automatic weapon whose external dimensions are not disadvantageously enlarged by the external drive and whose external drive is simplified in construction.

It is a further object of the present invention to provide an externally drive automatic weapon whose external dimensions are not advantageously enlarged by the external drive and utilizes a different type driving arrangement than the prior art devices.

The above first object is generally accomplished according to a first arrangement of the invention by an externally driven automatic weapon which comprises a gun barrel, a weapon housing connected to the barrel, a breachblock and cartridge supply slide mounted within the housing for linear movement along the bore axis of the gun barrel, a control cylinder having an outer circumferential surface provided with a camming path which is in a form-locking connection with the breachblock and cartridge supply slide, means for rotatably mounting the control cylinder within the housing so as to cause reciprocating linear movement of the breechblock and cartridge supply slide upon rotation of the control cylinder, and drive means disposed within the control cylinder for rotating the cylinder, with the drive means including a motor and a gear assembly means, including at least one gear which is rotatably mounted in a gear housing or gear block, for coupling the output of the motor to the control cylinder; and wherein: the means for rotatably mounting the control cylinder includes first and second aligned stub shafts nonrotatably mounted in the housing and respective rotary bearings supporting the control cylinder on the stub shafts; the motor is fastened to the first stub shaft; and the gear housing or gear block is disposed within the control cylinder between the motor and the second stub shaft and is fastened to one of the second stub shaft and the control cylinder.

The above second object is generally accomplished according to a further arrangement of the invention by an externally driven automatic weapon including a gun barrel, a weapon housing connected to the barrel, a breechblock and cartridge supply slide mounted within the housing for linear movement along the bore axis of the barrel, a control cylinder having an outer circumferential surface provided with a camming path which is in a form-locking connection with the breechblock and cartridge supply slide, means for rotatably mounting the control cylinder within the housing so as to cause reciprocating linear movement of the breech block and cartridge supply slide upon rotation of the control cylinder, and drive means, including an electric motor, for rotating the cylinder, with the motor being disposed within the control cylinder; and wherein: a continuous shaft, which is mounted in the housing, extends axially through the control cylinder; and the motor includes a first electrical coil arranged on the shaft and a second electrical coil arranged on the inner wall of the control cylinder and radially spaced from the first coil, whereby the control cylinder itself forms part of the electric motor.

The present invention specifically locates the motor and/or the gears within the control cylinder. The various embodiments of the invention are based on the realization that for automatic weapons whose energy made available by an external drive is converted from a rotational movement of the control cylinder into a reciprocating linear movement of breechblock and the elements supplying the cartridge and removing the cartridge cases, the control cylinder is a component having a relatively large size compared to the size of the automatic weapon and also has a large amount of unutilized internal volume. With a structurally given stroke length for the breechblock or cartridge supplying pusher, the circumference of the control cylinder depends exclusively on the force transmission and acceleration relationships existing between the camming path of the control cylinder and the guide roller of the breechblock engaging therein, which relationships are a function of the pitch or slope of the camming path or control groove. This constitutes a natural limitation in the direction toward smaller diameters for the control cylinder.

With the present invention a motor and/or drive mechanism can be located within the control cylinder and therefore a compact, externally driven automatic weapon can be provided in a very advantageous manner. This arrangement permits extraordinary optimization of volume and weight, while simultaneously, due to the short paths for transmission of force to the machine part to be moved, namely the control cylinder or the drum and the form-lockingly connected breechblock, permitting favorable configuration possibilities for the derived kinematics.

According to the first arrangement of the invention, the gear mechanism may be, for example, a planetary gear. The motor may be charged with energy electrically, pneumatically or hydrostatically, with the energy preferably being supplied (e.g. in the form of electrical wires if an electric motor is used) through a non-rotating side of a shaft fixed to the housing for the motor-drive mechanism-cylinder combination.

According to one embodiment of the first arrangement according to the invention, the gear housing or gear block of the drive means is fixed or connected to the control cylinder. This may be realized for a drive unit configured as a planetary gear, for example, by means of spline grooves or multi-wedged teeth disposed on the outer circumference of the gear housing or gear block and on the inner wall of the control cylinder. This permits a favorable shortening in size and a reduction of the space required for the gears within the control cylinder since at least a form-locking connection of the gears with their adjacent components is not effected in the axial direction but in the radial direction by means of its circumferential surface.

According to another embodiment of the first arrangement according to the invention, the gear housing or gear box is fixed or connected to the second stub shaft which is oppositely disposed to the first stub shaft to which the motor, preferably an electric motor, is fastened and with both stub shafts being secured against rotation. With this possibility, economical electric motors and gears with given flange connections, all as available on the market, can be employed. It is merely necessary to appropriately adapt the connecting flanges, which are fastened to the rotationally secure stub shafts, to the correct sizes.

With the second arrangement according to the invention wherein separate coils are provided on a shaft, which extends axially through the control cylinder and is mounted, for example, fixedly or non-rotatably, to the housing, and on the inner wall of the control cylinder so that the control cylinder itself is an integrated component of the electric motor, a further advantageous possibility of reducing volume and weight is achieved. This variation is particularly suitable for larger, high performance automatic weapons which consume a large amount of energy, with the electric motor reaching its largest possible structural size corresponding to the outer dimensions of the control cylinder.

Due to the favorable location of its center of gravity and its suitable configuration, a weapon equipped with a "central" drive as described, can be mounted much more easily. The short transmission paths and the short form-locking chain on the driving side, as well as the reduction of the inert masses to be moved, result in significantly improved start-up and stopping capabilities for the movable parts of the weapon. One example of the improvement achieved is with regard to fire control and rapid stops.

Finally, according to a preferred embodiment of the invention according to the second arrangement, the axial shaft, and hence the internal coil, is mounted so as to rotate within and relative to the control cylinder equipped with the external coil, with the shaft preferably being in operative connection with the control cylinder by way of an intermediate gear disposed within the control cylinder and rotatably mounted on a separate stub shaft fixed to or mounted on the housing. This advantageous configuration results in optimum space utilization of the volume of the control cylinder with easy regulatability and high relative velocity of the coils with respect to one another and a correspondingly low circumferential velocity of the control cylinder. The electric motor occupies the largest area possible and is of a high performance design while the gears are minimized to a single intermediate gear which does not take up much space. The interconnection of a gear between the rotatably mounted shaft and the rotatably mounted control cylinder makes it possible in a simple and uncomplicated manner, by reducing the gear assembly to one component, that in spite of the high rpm of the motor (namely the revolutions of the two coils relative to one another) only a limited number of revolutions of the control cylinder in the desired order of magnitude is made available to advance and retract the breechblock.

BRIEF DESCRIPTION OF THE DRAWINGS

The invention may be better understood by referring to the detailed description of the invention when taken in conjunction with the accompanying drawings in which:

FIG. 2 is a schematic longitudinal sectional view of an externally driven weapon showing another embodiment of the invention in which the control cylinder itself is configured as part of the electric drive motor.

FIG. 3 is a schematic longitudinal sectional view of an externally driven automatic weapon showing a modification of the arrangement of FIG. 1 in that the gear housing or gear block is fastened to the control cylinder for rotation therewith.

DESCRIPTION OF THE PREFERRED EMBODIMENTS

Figure 1:
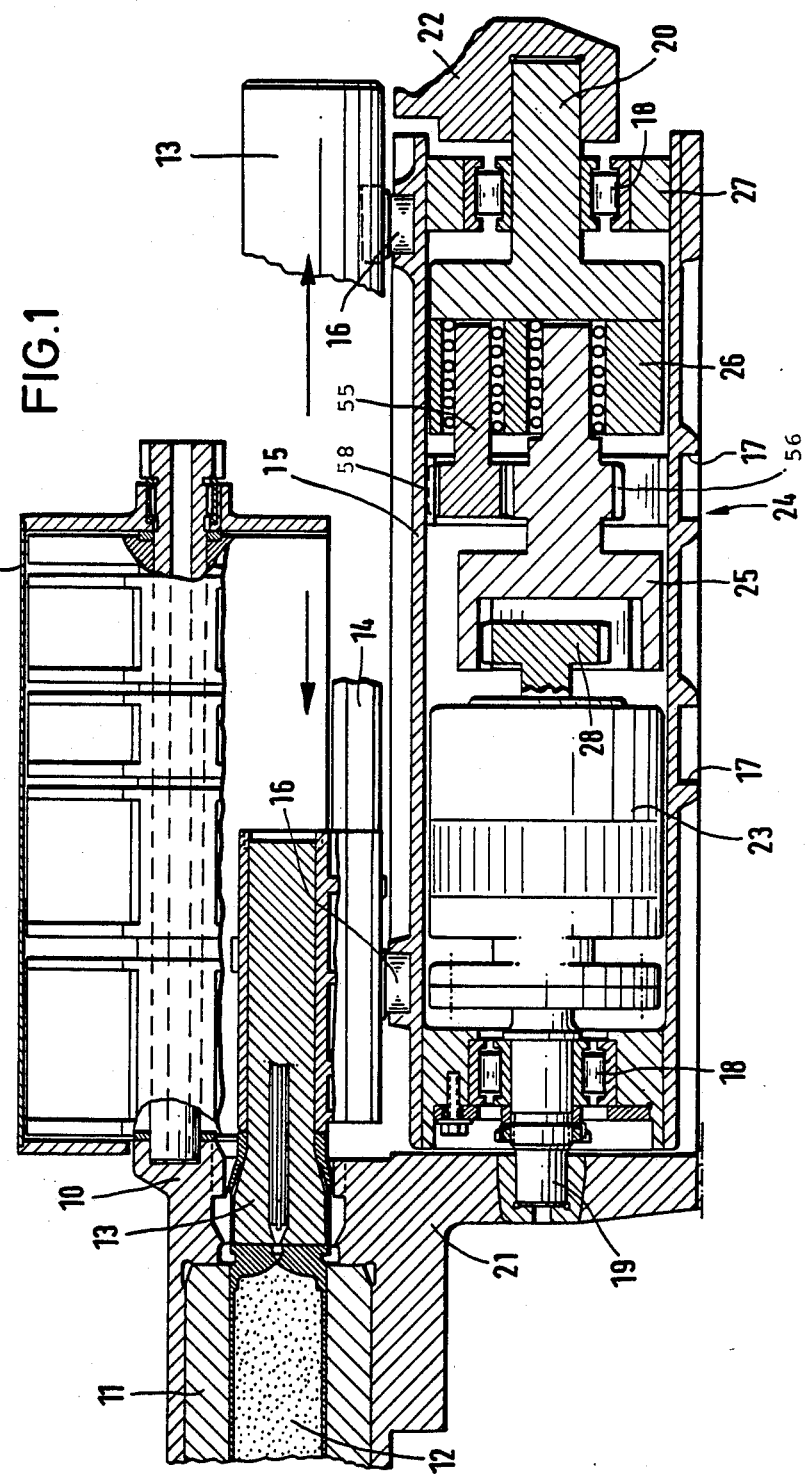
FIG. 1 is a schematic longitudinal sectional view of an externally driven automatic weapon provided with one embodiment of an arrangement according to the invention with the external drive motor and the gear housing or gear block being within the control cylinder and fastened to respective ones of the stub shafts.

In FIG. 1, the weapon housing of an automatic, externally driven weapon, e.g. a 35-caliber weapon, is marked with the reference numeral 10. The weapon housing 10 encloses a gun barrel 11 of which only the rear portion of the cartridge chamber with a cartridge 12 inserted therein is shown. The gun barrel 11 is followed toward the rear by a breechblock and/or cartridge supply slide 13 shown in the blocked position (front detent position). Along the extended bore axis of the gun barrel, in the rear region of the weapon, there is shown (in part) the rear section of the breechblock 13 in its open or rear detent position. Breechblock 13 is guided so as to be longitudinally displaceable in the weapon housing 10 by way of guide rails 14. A cartridge supply member 51 is provided to supply ammunition to be placed in the gun barrel 11.

Below guide rails 14 for breechblock 13, a rotatable control cylinder 15 is disposed in the weapon housing. To drive the breechblock 13 or, more precisely, to displace it linearly, a guide roller 16 provided at the bottom of breechblock 13 engages in a form-locking manner in an endless camming path or groove 17 disposed on the outer circumference of control cylinder 15. Control cylinder 15 is mounted by means of respective rotary bearings 18 so as to be rotatable on two nonrotatable stub shafts 19, 20 which lie in a row parallel to the bore axis of the gun barrel 11 and are fixedly mounted in respective bearing blocks 21, 22 attached to the weapon housing 10. In order to enable the control cylinder 15 to be disassembled, the rear bearing block 22 is releasably flanged or connected to the weapon housing 10.

According to this embodiment of the invention, an external drive or motor 23 and gears 24 are arranged within control cylinder 15. The housing of drive 23 is nonrotatable since it is fixedly flanged to the front stub shaft 19. Drive 23 is also in form-locking connection with gears 24. Gears 24 are composed of at least one step-up gear 25 rotatably mounted in gear block 26 which is flanged or connected to rear stub shaft 20. In the illustrated embodiment a spur or intermediate gear 55 is likewise mounted in the gear block 26, and is in engagement with further gear teeth 56 on the gear 25 and with a circumferentially extending row of gear teeth 58 located on the inner wall of control cylinder 15. With this arrangement, the rotary output of the motor 23 is transferred via a drive gear 28 to the step-up gear 25 which via spur gear 55 and gear teeth 58 causes the control cylinder 15 to rotate. To install or remove drive 23 and gears 24, control cylinder 15 is provided, at least at its rear side, with a releasable radial end plate 27 in which the respective bearing 18 is disposed.

Drive 23 may be an electric motor to which electric current is supplied electrically or, in another embodiment, may be a drive device which is charged with energy pneumatically (e.g. gas turbine) or hydrostatically (e.g. hydraulic motor). The supplying of energy in the form of electrical current, compressed air or hydraulic oil is effected by means of conduits extending through one of the non-rotating stub shafts 19 or 20 which are fixed to the housing 10. The arrangement of the drive 23 and the gears 24 in the control cylinder 15 may of course also be reversed, with the drive 23 being flanged to the rear stub shaft 20.

In the embodiment of the invention illustrated in FIG. 1, gears 24 have a stationary gear block 26 around which control cylinder 15 rotates. According to another advantageous embodiment as shown in FIG. 3, the gear housing or gear block 26 is not fixed to the housing 10 by means of the stub shaft 20, but rather is fixed in a space saving manner in the form of a planetary gear to the inner wall of control cylinder 15 by means of its outer circumference for rotation with the control cylinder. The form-locking connection between the inner wall of the control cylinder 15 and the outer wall of the gear housing or gear block 26 can be effected by way of a rotationally secure axially parallel spline or multi-wedge teeth connection 60 which permits extraction of the gears from the control cylinder 15 in the axial direction. The step-up gear 25 is here preferably pushed over drive gear 28 and is provided with internal teeth. As shown, the end plate 27 is likewise releasably positioned in the cylinder 15 by a spline connection 61 to permit axial extraction.

The cadence of the automatic weapon can be varied by regulating the supply of driving energy or by way of regulating the rpm of drive motor 23.

With the above described embodiments of a nested motor - drive - housing combination, the present invention makes it possible, in a very advantageous and simplified manner, to produce a compact automatic weapon having reduced external dimensions, i.e. a reduced total volume and also reduced weight, in which there exist additional good possibilities for configuring the derived kinematics by shortening the force transmission paths.

Figure 2:
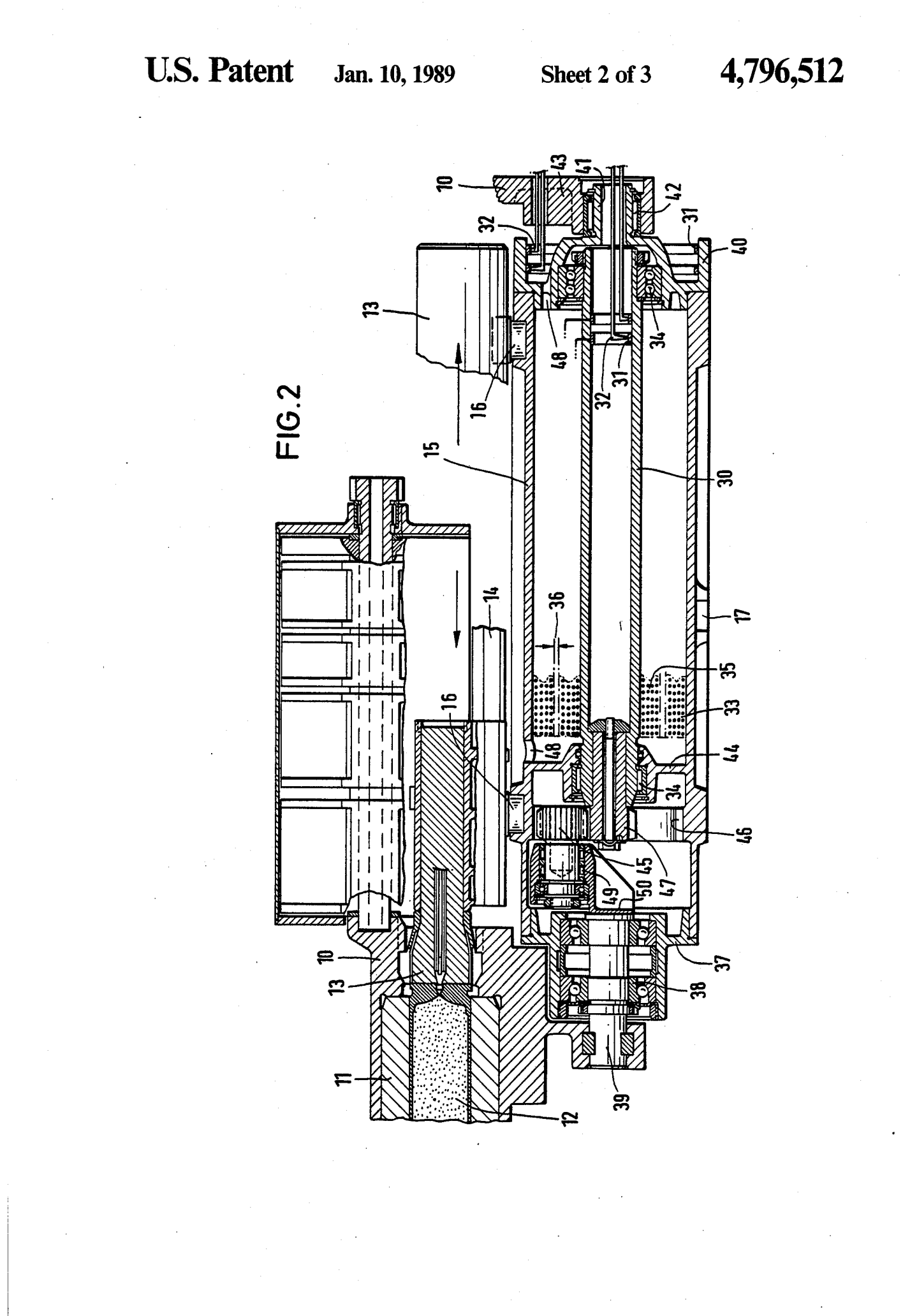

According to the embodiment of the invention shown in FIG. 2, the control cylinder 15 itself is configured as part of an electric motor. The description of FIG. 2 continues to employ reference numerals that have already been introduced for identical components.

As shown, an external electrical coil 33 is disposed on the inner wall of control cylinder 15 and an internal electrical coil 35 is disposed on a central shaft 30, with both coils being separated from one another by a narrow gap 36. If current flows through the coils 33 and 35, they generate an electromotive force and perform relative movements (rotations) with respect to one another. Following the terminology employed for electric motors, the internal coil 35 seated on the central shaft 30 in the illustrated embodiment should be called the rotor and the external coil 33 on the control cylinder 15 should be called the stator (which in this embodiment rotates as well).

The front side of control cylinder 15 is mounted on a rotary bearing 38 disposed in a frontal end plate or member 37 so as to rotate on a secure stub shaft 39 fixed to the weapon housing 10. On its rear side, control cylinder 15 has a rear end plate or member 40 equipped with an externally axially projecting hollow end member 41 which forms a stub axel and which is rotatably fastened by means of a rotary bearing 42 in a rear bearing block 43 connected to the housing 10. For the purpose of assembly or disassembly, bearing block 43 is releasably flanged or connected to weapon housing 10. By means of respective rotary bearings 34 disposed in rear end plate 40 and in an internal partition 44 of cylinder 15, central shaft 30 is mounted so as to be rotatable coaxially within control cylinder 15 and relative to same.

An intermediate gear 45 is rotatably fastened by means of an eccentrically arranged bearing block 50 and its bearing 49 to the rearwardly oriented end of front stub shaft 39. Intermediate gear 45 meshes with gear teeth 46 formed on the inner surface of control cylinder 15 and with a gear 47 fastened to the forwardly oriented end of central shaft 30. This produces a form-locking connection between the control cylinder 15 and the central shaft 30 (rotor and stator of the electric motor) so that the circumferential surface of the control cylinder 15 and the camming path 17 worked therein to perform controlled and regulatable rotary movements generated by the regulated supply of energy (electrical current). The introduction of electrical energy into external coil 33 and internal coil 35 is effected by means of respective slip contacts 32 which engage respective slip rings 31 which are disposed internally at protected locations in the rear end regions of the control cylinder 15 and the central shaft 30. The leads to slip rings 31 for coils 33 and 35 are brought through special bores in central shaft 30 or through existing ventilation bores 48 in rear end plate 40.

With this embodiment according to the invention wherein the control cylinder is part of the electric motor itself, i.e., an electric motor with a rotating outer housing known in the conveying art as a barrel-type engine, the volume within the control cylinder 15 is given the best use possible in that the largest possible motor dimensions are realized and high performance results.

It will be understood that the above description of the present invention is susceptible to various modifications, changes and adaptations, and the same are intended to be comprehended within the meaning and range of equivalents of the appended claims.

What is claimed is:

1. In an externally driven automatic weapon including a gun barrel, a weapon housing connected to said barrel, a breechblock and cartridge supply slide mounted within said housing for linear movement along the bore axis of said barrel, a control cylinder having an outer circumferential surface provided with a camming path which is in a form-locking connection with said breechblock and cartridge supply slide, means for rotatably mounting said control cylinder within said housing so as to cause reciprocating linear movement of said breechblock and cartridge supply slide upon rotation of said control cylinder, and drive means, including an electric motor, for rotating said cylinder, with said motor being disposed within said control cylinder; the improvement wherein: a continuous shaft, which is mounted in said housing, extends axially through said control cylinder; and said motor includes a first electrical coil arranged on said shaft and a second electrical coil arranged on the inner wall of said control cylinder and radially spaced from said first coil, whereby said control cylinder itself forms part of said electric motor.

2. An automatic weapon as defined in claim 1, wherein: said control cylinder is mounted in said housing for rotation about an axis parallel to the bore axis of said barrel; said control cylinder, on its end oriented opposite to the direction of firing, is provided with a releasable end member; said means for rotatably mounting said control cylinder includes an axially extending shaft member disposed in a rotary bearing with one of said shaft member and said rotary bearing being mounted in said end member and the other being mounted in a bearing block; and said bearing block is releasably connected to said weapon housing so that it can be detached.

3. An externally driven automatic weapon as defined in claim 1, wherein said shaft is rotatably mounted in said housing for rotation relative to said control cylinder.

4. An externally driven automatic weapon as defined in claim 3, wherein respective slip rings, which are in electrical contact communication with respective slip contacts mounted on said weapon housing, are provided on said inner surface of said control cylinder and on an inner surface of said continuous shaft for supplying electrical energy to said first and second rotating coils disposed respectively on said continuous shaft and on said control cylinder.

5. An externally driven automatic weapon as defined in claim 3, further comprising: an intermediate gear disposed within said control cylinder and rotatably mounted on a stub shaft nonrotatably fixed to said housing, with said intermediate gear being in operative engagement with a gear on said continuous shaft and a gear on said control cylinder.

6. An externally driven automatic weapon as defined in claim 5, wherein said gear on said control cylinder comprises a circumferentially extending row of gear teeth formed on the inner surface of said control cylinder adjacent one end of said cylinder.

* * * * *